US008482771B2

(12) United States Patent
Murayama

(10) Patent No.: US 8,482,771 B2
(45) Date of Patent: Jul. 9, 2013

(54) PRINTING APPARATUS

(75) Inventor: Hiroyuki Murayama, Iwate (JP)

(73) Assignee: Citizen Holdings Co., Ltd., Tokyo (JP)

( * ) Notice: Subject to any disclaimer, the term of this patent is extended or adjusted under 35 U.S.C. 154(b) by 556 days.

(21) Appl. No.: 12/681,246

(22) PCT Filed: Oct. 17, 2008

(86) PCT No.: PCT/JP2008/068866

§ 371 (c)(1), (2), (4) Date: Apr. 1, 2010

(87) PCT Pub. No.: WO2009/051227

PCT Pub. Date: Apr. 23, 2009

(65) Prior Publication Data

US 2010/0214575 A1 Aug. 26, 2010

(30) Foreign Application Priority Data

Oct. 19, 2007 (JP) ................................. 2007-272686

(51) Int. Cl.
*G06F 3/12* (2006.01)
*G06K 15/22* (2006.01)

(52) U.S. Cl.
USPC ........................... 358/1.15; 358/1.13; 358/1.4

(58) Field of Classification Search
None
See application file for complete search history.

(56) References Cited

U.S. PATENT DOCUMENTS 5,154,411 A 10/1992 Saito et al.
5,984,445 A * 11/1999 Morita et al. ...................... 347/2
6,331,003 B1 * 12/2001 Yokota et al. ................. 271/290
6,351,321 B1 * 2/2002 McIntyre et al. ............. 358/450

FOREIGN PATENT DOCUMENTS

JP 02-176670 7/1990
JP H8-211673 8/1996
JP 09-200391 7/1997
JP 2002-220151 8/2002
JP 2003-094748 4/2003
JP 2004-042311 2/2004
JP 2005-028598 2/2005

OTHER PUBLICATIONS

Machine Translation of JP 2005-028598, pp. 1-34 (Note that JP 2005-028598 is cited in the IDS dated Apr. 1, 2010).*

(Continued)

*Primary Examiner* — Dov Popovici
(74) *Attorney, Agent, or Firm* — Myers Wolin, LLC

(57) ABSTRACT

A printing apparatus includes multiple image printers (700) that respectively print an image on a front surface of a paper, a back surface printer that prints given information on the back surface of a paper printed with an image by the image printer (700), a sorter (104) that sorts papers printed with given information on the back surfaces by the back surface printer, a first conveyance path that conveys a paper printed with an image on the front surface by the image printer (700) to the back surface printer, and a second conveyance path that conveys a paper printed with given information on the back surface by the back surface printer to the sorter (104). The back surface printer, the sorter (104), and the second conveyance path are integrated into an upper casing (101).

9 Claims, 12 Drawing Sheets

OTHER PUBLICATIONS

International Search Report for corresponding International Patent Application No. PCT/JP2008/068866, mailed Jan. 6, 2009. English translation attached.

International Preliminary Report on Patentability and Written Opinion of International Searching Authority for corresponding International Patent Application No. PCT/JP2008/068866, issued May 11, 2010. English translation attached.

Notice of Rejection mailed Nov. 29, 2011, from corresponding JP Application 2007-272686, and accompanying translation.

* cited by examiner

PRINTING APPARATUS

CROSS REFERENCE TO RELATED APPLICATIONS

The present disclosure is a national phase filing under 35 U.S.C. §371 of International Patent Application No. PCT/JP2008/068866 filed on Oct. 17, 2008, which claims priority to Japanese Patent Application No. 2007-272686, filed on Oct. 19, 2007, the disclosures of which are expressly incorporated herein by reference in its entireties.

TECHNICAL FIELD

The present invention relates to a printing apparatus that prints an image on a sheet and has a back printing (back print) function of printing given information on a reverse surface of the printed image.

BACKGROUND ART

Among conventional technologies is a printing apparatus capable of reliable, high-speed printing while enabling a reduction in planar installation space for the apparatus (see, e.g., Patent Document 1). According to Patent Document 1, as depicted in FIG. 1, engine units respectively making up each printer can be stacked vertically.

Another conventional technology is a multiprint system having multiple printer units carrying out photograph printing (see, e.g., Patent Document 2). The multiprint system of Patent Document 2 includes multiple supplementary-information recording apparatuses capable of printing an image and recording supplementary-information.

Yet another conventional technology is an image recording apparatus having multiple tiers of image recording units to improve processing efficiency (see, e.g., Patent Document 3). The image recording apparatus of Patent Document 3 includes multiple ink jet recording units and a back printing unit.

Patent Document 1: Japanese Patent Application Laid-Open Publication No. H08-211673

Patent Document 2: Japanese Patent Application Laid-Open Publication No. 2004-42311

Patent Document 3: Japanese Patent Application Laid-Open Publication No. 2003-94748

DISCLOSURE OF INVENTION

Problem to be Solved by the Invention

The conventional printing apparatus above (Patent Document 1), however, does not have the required back printing function with respect to printing a color image, such as a photograph, thus poses a problem of being incapable of the back printing.

The conventional multiprint system above (Patent Document 2) includes the supplementary-information recording apparatus, which prints supplementary-information on the same surface (front surface) on which an image is printed and thus, is incapable of printing on the back surface. Because each printer unit has a supplementary-information recording apparatus, the system as a whole cannot be reduced in size, arising in a problem in that space-saving cannot be achieved. In addition, since each supplementary-information recording apparatus must be maintained, a problem of more complicated maintenance work arises.

The conventional image recording apparatus above (Patent Document 3) includes the back printing unit and is configured to carry out back printing before printing an image. The image recording apparatus is, therefore, not configured to print given information for an image after completion of printing the image. When the maintenance (ink replacement, etc.) of the back printing unit is carried out, all image recording units come to a stop, which poses a problem in that an efficient recording process is not possible.

If sheets bearing recorded images are discharged in a given order to a sorter and a malfunction, such as paper-jamming, occurs at an image recording unit, a sheet back-printed with information that should be discharged later is supplied to another image recording unit and thus, printing cannot be performed because the image recorded and the image that should be recorded first are switched. To print the image, this leaves no alternative but to discard the sheet having undergone back printing and supplied to the image recording unit that has not malfunctioned, and resupply to the image recording unit that has not malfunctioned, a sheet bearing on the back surface, the information to be discharged first. This poses a problem in that an efficient recording process is not possible.

The above conventional apparatuses and system (Patent Documents 1 to 3) are not provided with a sorter and thus, are incapable of sorting printed sheets. The incorporation of a sorter to the apparatuses and the system brings about a problem of an increase in the size of the apparatuses and system.

An object of the present invention is to provide a printing apparatus that achieves high-speed image printing and a back printing function while enabling space saving and improving operability for printed sheet discharge, etc.

Means for Solving Problem

To solve the above problems, a printing apparatus according to the present invention includes multiple image printers that print an image on a front surface of a paper, respectively; a back surface printer that prints given information on a back surface of a paper printed with an image by one of the image printers; a sorting unit that sorts papers printed with the given information on the back surfaces by the back surface printer; a first conveying unit that conveys a paper printed with an image on the front surface by the image printer to the back surface printer; and a second conveying unit that conveys a paper printed with given information on the back surface by the back surface printer to the sorting unit to discharge the paper onto the sorting unit.

The printing apparatus according to the present invention and based on the above invention is characterized by the sorting unit being disposed above the back surface printer.

The printing apparatus according to the present invention and based on the above invention is characterized by the back surface printer, the sorting unit, and the second conveying unit being integrated into a casing.

The printing apparatus according to the present invention and based on the above invention further includes a paper storage tray above the sorting unit, where the second conveying unit includes a conveyance path that conveys a paper printed with given information on the back surface by the back surface printer to the sorting unit and to the paper storage tray; and a switching unit that carries out switchover between discharge of the paper to the sorting unit and discharge of the paper to the paper storage tray.

The printing apparatus according to the present invention and based on the above invention is characterized by the back surface printer, the sorting unit, the paper storage tray, and the second conveying unit being integrated into a casing.

The printing apparatus according to the present invention and based on the above invention is characterized by the casing being disposed on top of the image printers vertically aligned.

The printing apparatus according to the present invention and based on the above invention is characterized by the sorting unit being detachable from the casing.

The printing apparatus according to the present invention and based on the above invention is characterized by the second conveying unit including a paper sensor, and the first conveying unit conveying to the back surface printer, a paper printed with an image on the front surface by the image printer, when the paper sensor detects discharge, from the back surface printer to the second conveying unit, of a paper printed with given information on the back surface.

The printing apparatus according to the present invention and based on the above invention is characterized by the second conveying unit including a paper sensor, and the image printer discharging a paper printed with an image on the front surface to the first conveying unit, when the paper sensor detects discharge, from the back surface printer to the second conveying unit, of a paper printed with given information on the back surface.

Effect of the Invention

The present invention offers an effect of increasing image printing speed, achieving a back printing function, saving space for a printing apparatus, and facilitating sheet discharge to improve operability.

EXPLANATIONS OF LETTERS OR NUMERALS

Figure 1:
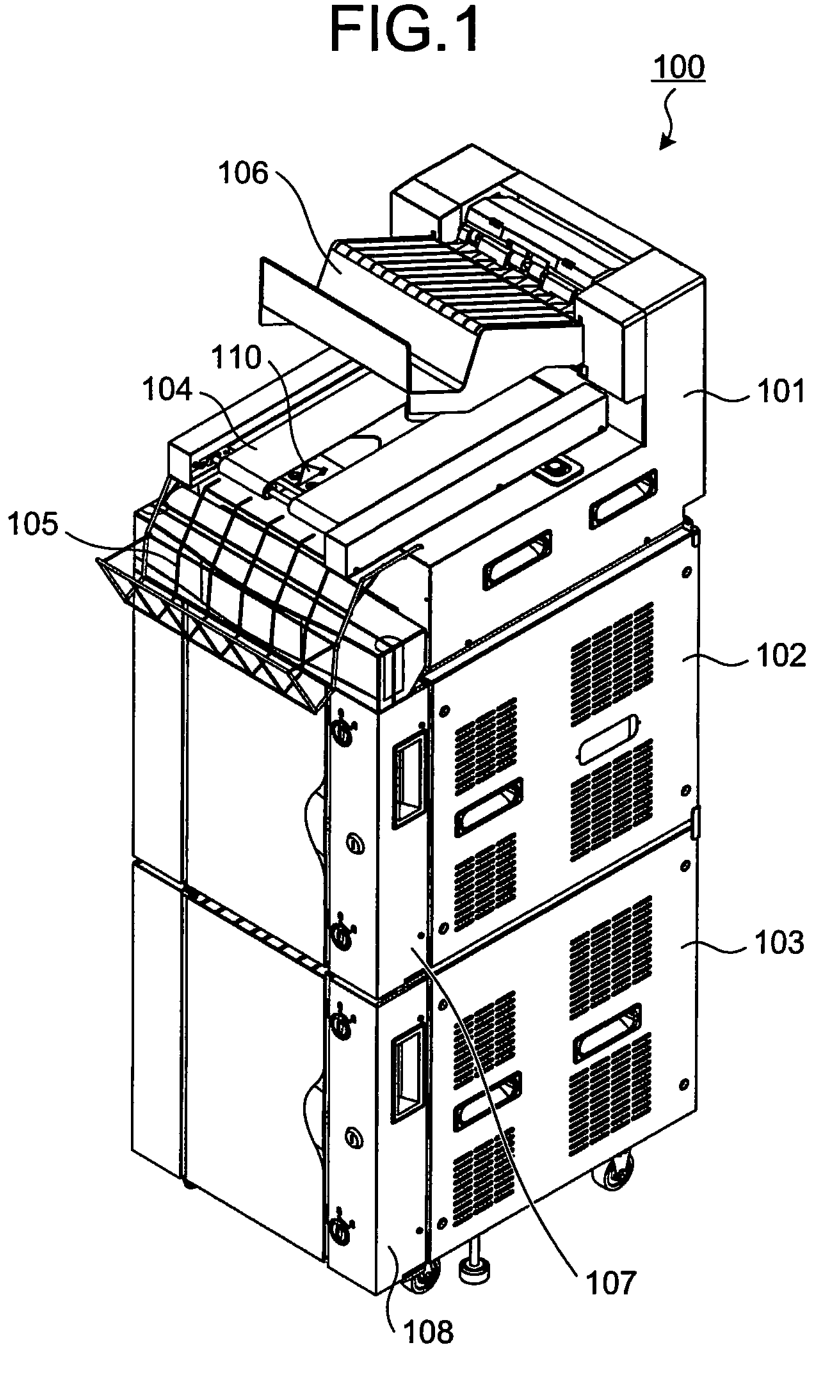
FIG. 1 is an external perspective view of a printing apparatus according to an embodiment of the present invention.

100 printing apparatus
101 upper casing
102, 103 lower casing
104 sorter
105 sorter auxiliary tray
106 paper storage tray
107, 108 lower casing door member
109 control unit housing member
110 paper placement sensor
601 USB/LAN connection terminal
602 AC power supply terminal
700 (700*a*, 700*b*, 700*c*, 700*d*) image printer
701 (701*a*, 701*b*, 701*c*, 701*d*) image printer discharge outlet
702 (702*a*, 702*b*, 702*c*, 702*d*) lower casing inlet
703, 705, 802 conveyance roller
704 lower casing exit
706 upper casing inlet
800 back surface printer
801 second conveyance path
803 paper sensor
804, 805 second conveyance path exit
806 conveyance path switching unit
900 sorter conveyer belt
901 sorter conveyance roller
1000 bus
1001 CPU
1002 ROM
1003 RAM
1004 data input/output unit
1005 motor control unit
1006 sorter control unit
1007 switching control unit

BEST MODE(S) FOR CARRYING OUT THE INVENTION

Preferred embodiments of a printing apparatus of the present invention will be described in detail with reference to the accompanying drawings.

(Configuration of Printing Apparatus)

Figure 2:
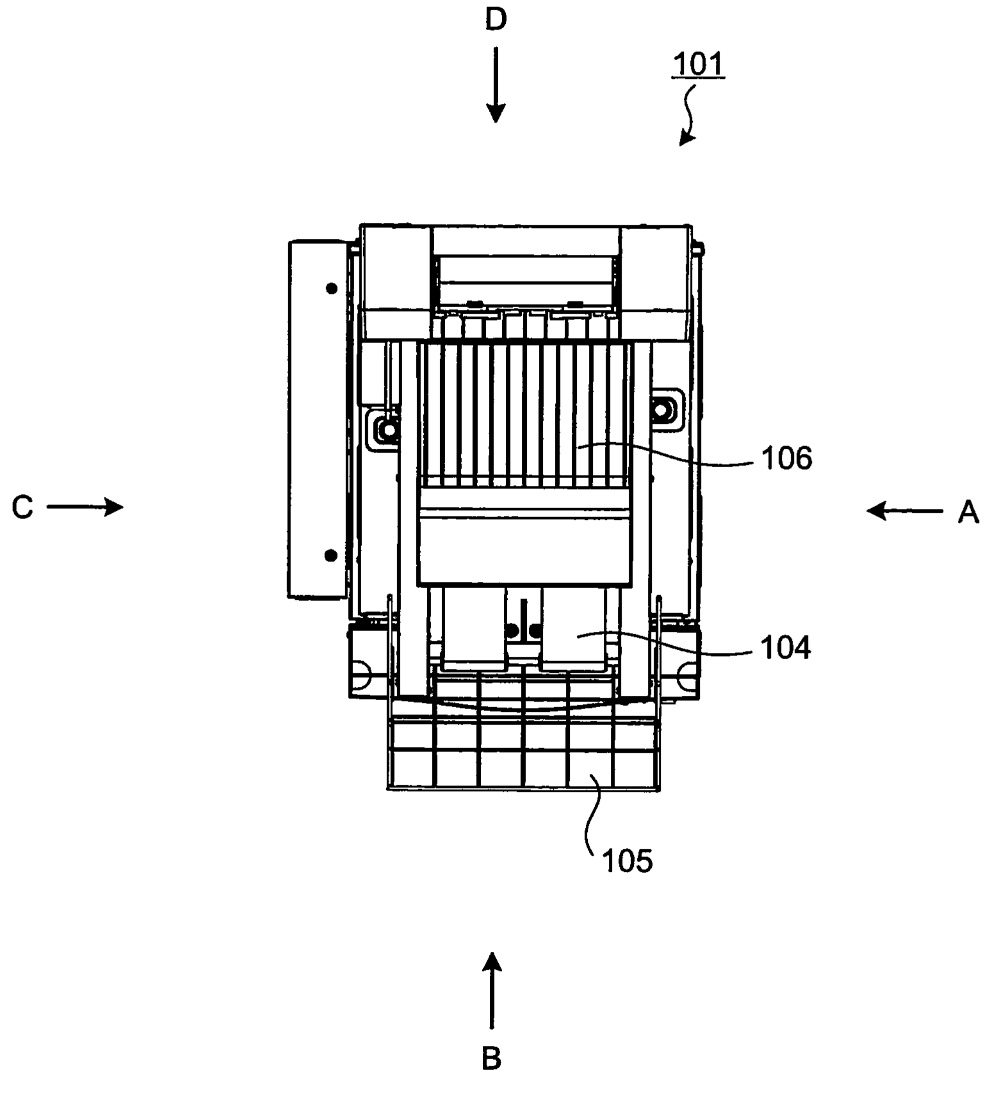
FIG. 2 is an external top view of the printing apparatus according to the embodiment of the present invention.
Figure 3:
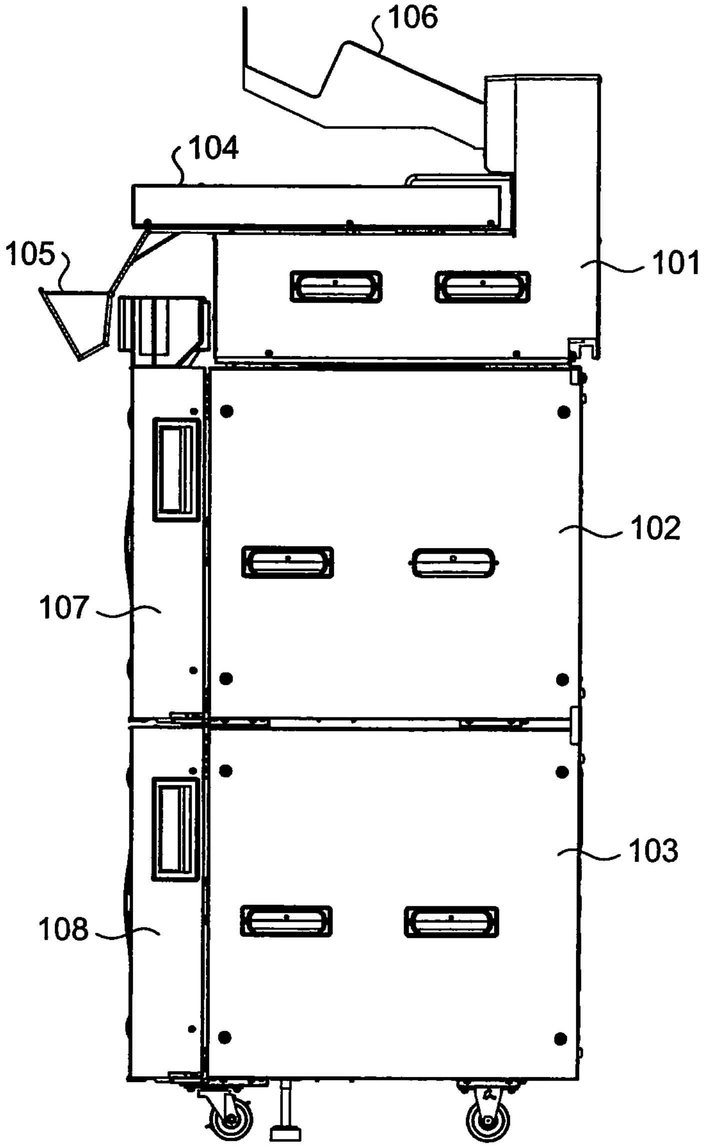
FIG. 3 is an external side view of the printing apparatus according to the embodiment of the present invention (part 1)
Figure 4:
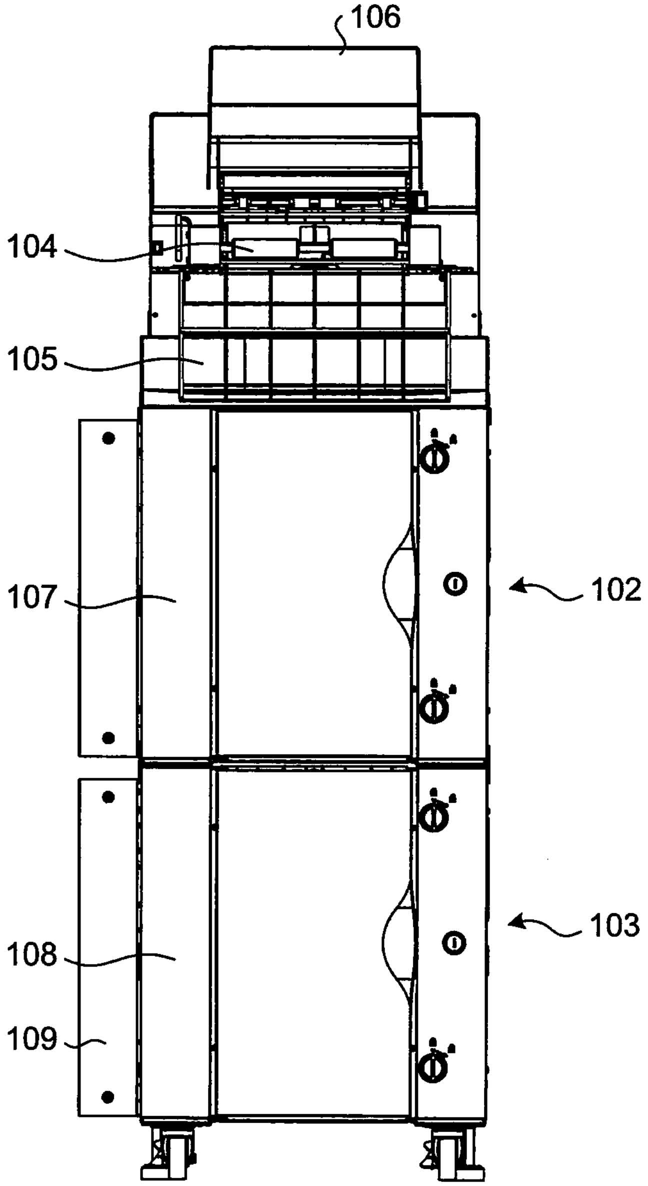
FIG. 4 is an external side view of the printing apparatus according to the embodiment of the present invention (part 2)
Figure 5:
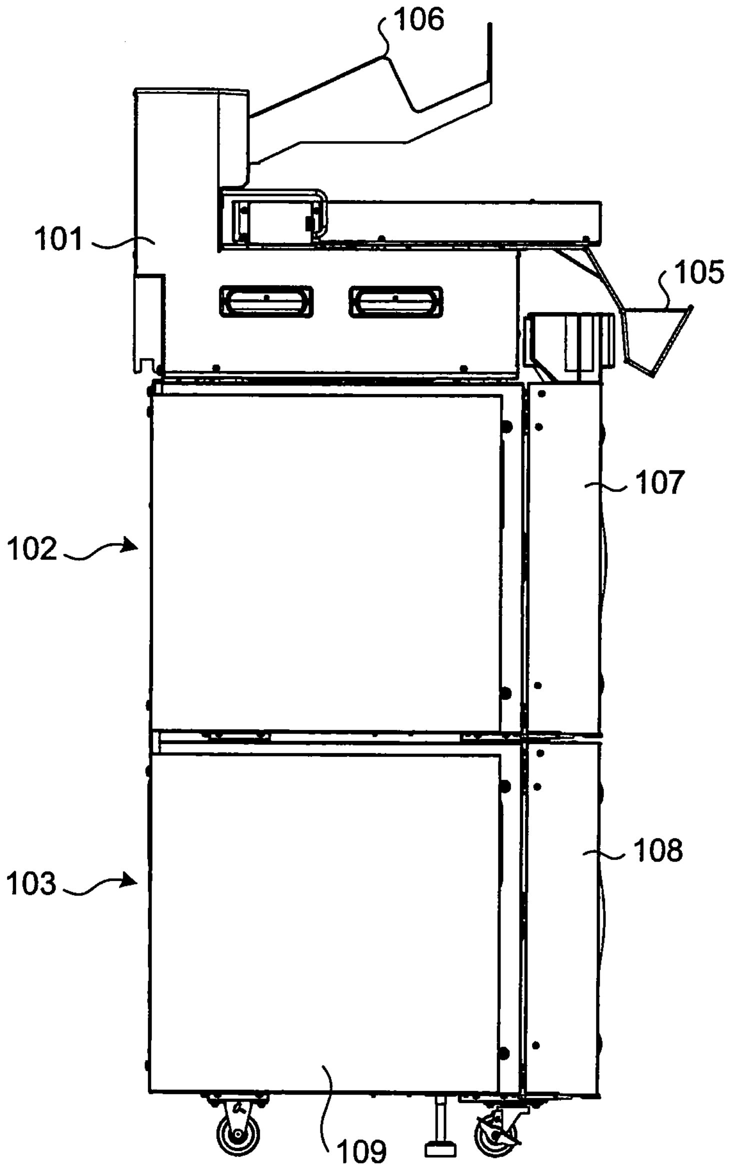
FIG. 5 is an external side view of the printing apparatus according to the embodiment of the present invention (part 3)
Figure 6:
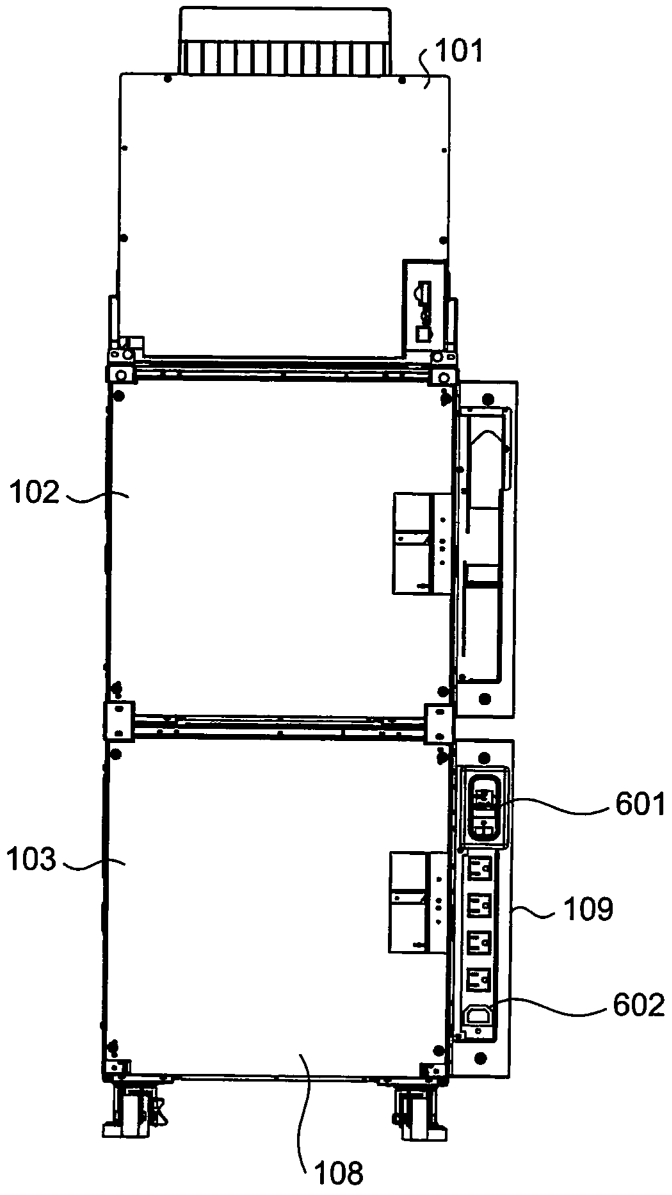
FIG. 6 is an external side view of the printing apparatus according to the embodiment of the present invention (part 4)
Figure 7:
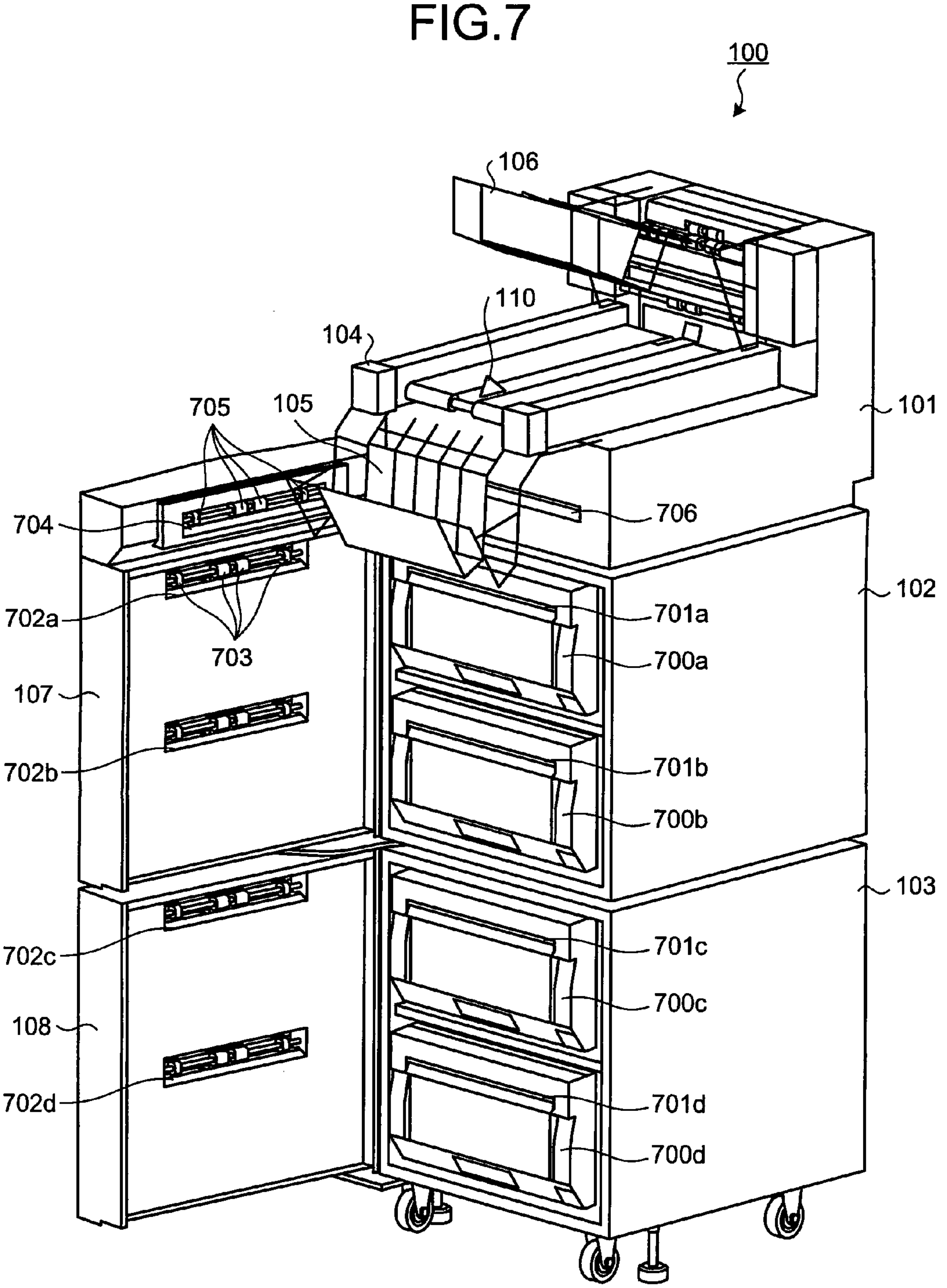
FIG. 7 is a perspective view of an internal configuration of the printing apparatus according to the embodiment of the present invention.

A functional configuration of a printing apparatus will be described. FIG. 1 is an external perspective view of the printing apparatus according to an embodiment of the present invention. FIG. 2 is an external top view of the printing apparatus according to the embodiment of the present invention. FIGS. 3 to 6 are external side views of the printing apparatus according to the embodiment of the present invention. A view from a direction A indicated in FIG. 2 is equivalent to FIG. 3, similarly, a view from a direction B is equivalent to FIG. 4, a view from a direction C is equivalent to FIG. 5, and a view from a direction D is equivalent to FIG. 6. FIG. 7 is a perspective view of an internal configuration of the printing apparatus according to the embodiment of the present invention.

In FIGS. 1 to 7, 100 denotes the printing apparatus, 101 denotes an upper casing, 102 and 103 denote lower casings, 104 denotes a sorter, 105 denotes a sorter auxiliary tray, 106 denotes a paper storage tray, 107 and 108 denote lower casing door members, 109 denotes a control unit housing member, and 110 denotes a paper placement sensor.

The printing apparatus 100 includes the two lower casings 102 and 103 vertically connected and the upper casing 101 connected to the top of the lower casing 102. The lower casings 102 and 103 each house two image printers 700, as depicted in FIG. 7.

The lower casing door members 107 and 108 can be opened and closed. FIG. 7 depicts a state where the lower casing door members 107 and 108 are opened. The lower casing door members 107 and 108 are opened for maintenance of the image printers 700, such as refilling ink or paper, and recovery from paper-jamming. A non-depicted first conveyance path is provided inside the lower casing door members 107 and 108.

As depicted in FIG. 7, from lower casing inlets 702 (702*a*, 702*b*, 702*c*, 702*d*) that are for the first conveyance path and correspond to image printer discharge outlets 701 (701*a*, 701*b*, 701*c*, 701*d*) of the image printers 700, the first conveyance path passes upward through the lower casing door members 107 and 108 to a lower casing exit 704 and an upper casing inlet 706, and further passes through the upper casing to a back surface printer 800.

When the lower casing door members 107 and 108 are closed, each of the image printer discharge outlets 701 of the image printers 700 comes in contact with each of the lower casing inlets 702. A paper discharged from the image printer discharge outlet 701 enters the lower casing inlet 702, and is conveyed through the first conveyance path to the lower casing exit 704 by the rotation of a conveyance roller 703. The paper is then conveyed from the lower casing exit 704 to the back surface printer 800 depicted in FIG. 8 by the conveyance roller 705.

In this manner, because the first conveyance path is disposed inside the lower casing door members, establishing a separate space for the first conveyance path is unnecessary, which enables a reduction in the housing area of the printing apparatus body.

The control unit housing member 109 houses a non-depicted control unit. In FIG. 6, 601 denotes a USB/LAN connection terminal on a side aspect of the control unit housing member 109, and 602 denotes an AC power supply terminal. The USB/LAN connection terminal is connected to a main computer to acquire image data to be printed by the image printer 700 and the back surface printer 800. Power is supplied from the AC power supply terminal 602 to the entire the printer apparatus, the image printer 700, the back surface printer 800, the sorter 104, and non-depicted motors disposed along the conveyance path.

In FIG. 6, 601 denotes the USB/LAN connection terminal, and 602 denotes the AC power supply terminal. The USB/LAN connection terminal 601 connects the control unit to the main computer, from which image data to be printed by the image printer 700 and the back surface printer 800 is acquired. Power is supplied from the AC power supply terminal 602 to the entire printer apparatus, the image printer 700, the back surface printer 800, the sorter 104, and the non-depicted motors disposed on the conveyance path.

The image printer 700, specifically, is provided as, for example, a dye-sublimation thermoelectric printer, an ink jet printer, etc., printing out a quality, color photographic image, etc. The paper is, specifically, for example, paper for photographic printing, which is provided as a roll (not depicted) stored in the image printer 700. The image printer is provided with a cutting unit (non-depicted cutter) that cuts the roll of paper. When the paper is discharged from the image printer 700 after printing is over, the printed paper is cut by the cutting unit into a prescribed size (e.g., size of a photograph). A printing process and a cutting process are, therefore, carried out as interlinked processes.

The image printers 700 (700*a*, 700*b*, 700*c*, 700*d*) may be the same type of printers, or may be different types of printers, for example, different in the size of paper that can be printed on. When four image printers of the same type are provided, simultaneous control over four printers enables a printing process four times as fast as a printing process by a single printer.

The upper casing 101 has the sorter 104, the paper storage tray 106 that holds paper of sizes not conforming to specifications for the sorter, such as a large-sized paper, and the back surface printer 800 (see FIG. 8) housed in the upper casing 101. The sorter 104, the paper storage tray 106, and the back surface printer 800 are integrated into the upper casing 101 and thus, connected to the top of the lower casing 102.

(Structure of Upper Casing)

Figure 8:
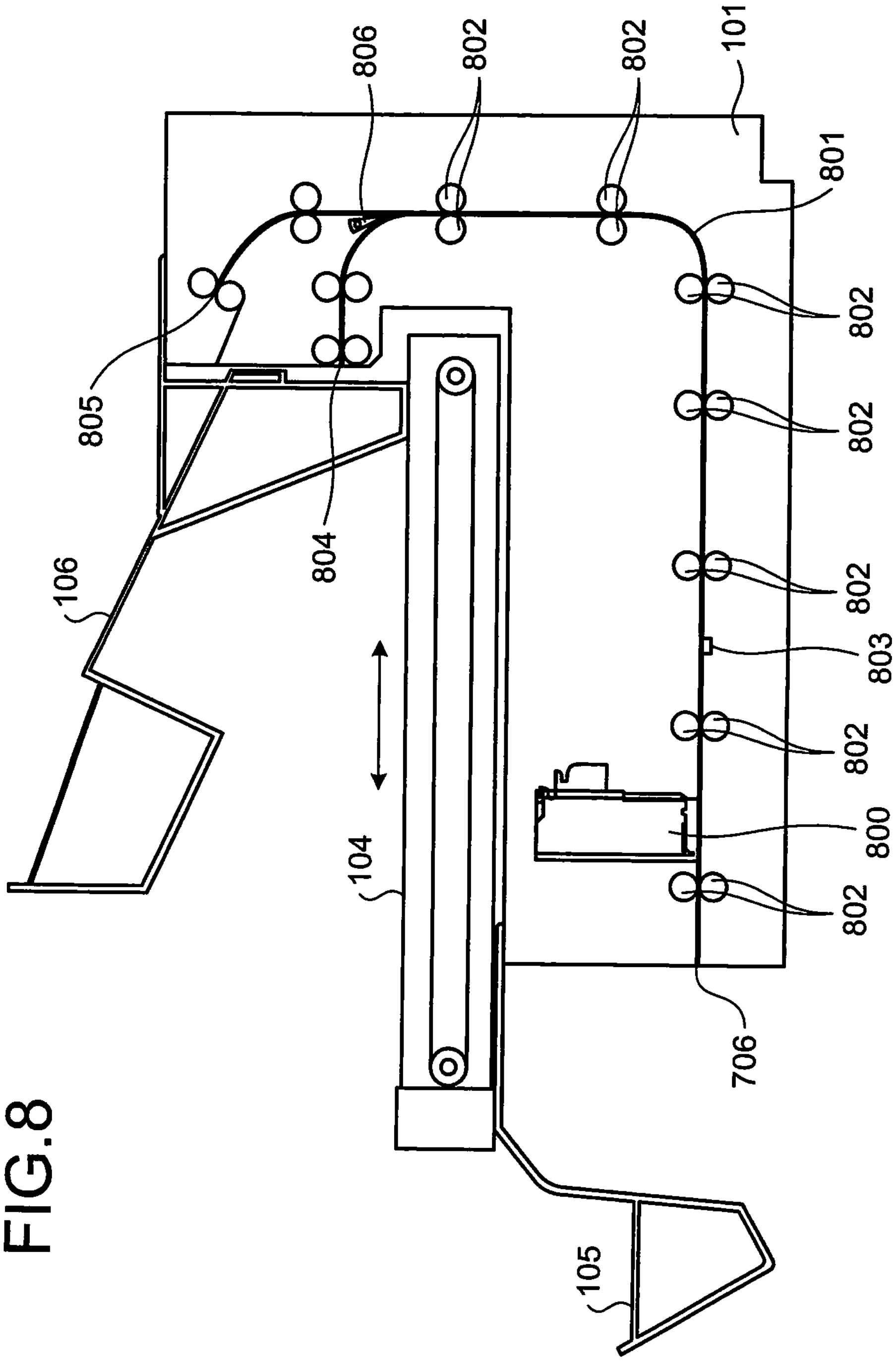
FIG. 8 is a sectional view of an internal configuration of the upper casing of the printing apparatus according to the embodiment of the present invention (part 1)
Figure 9:
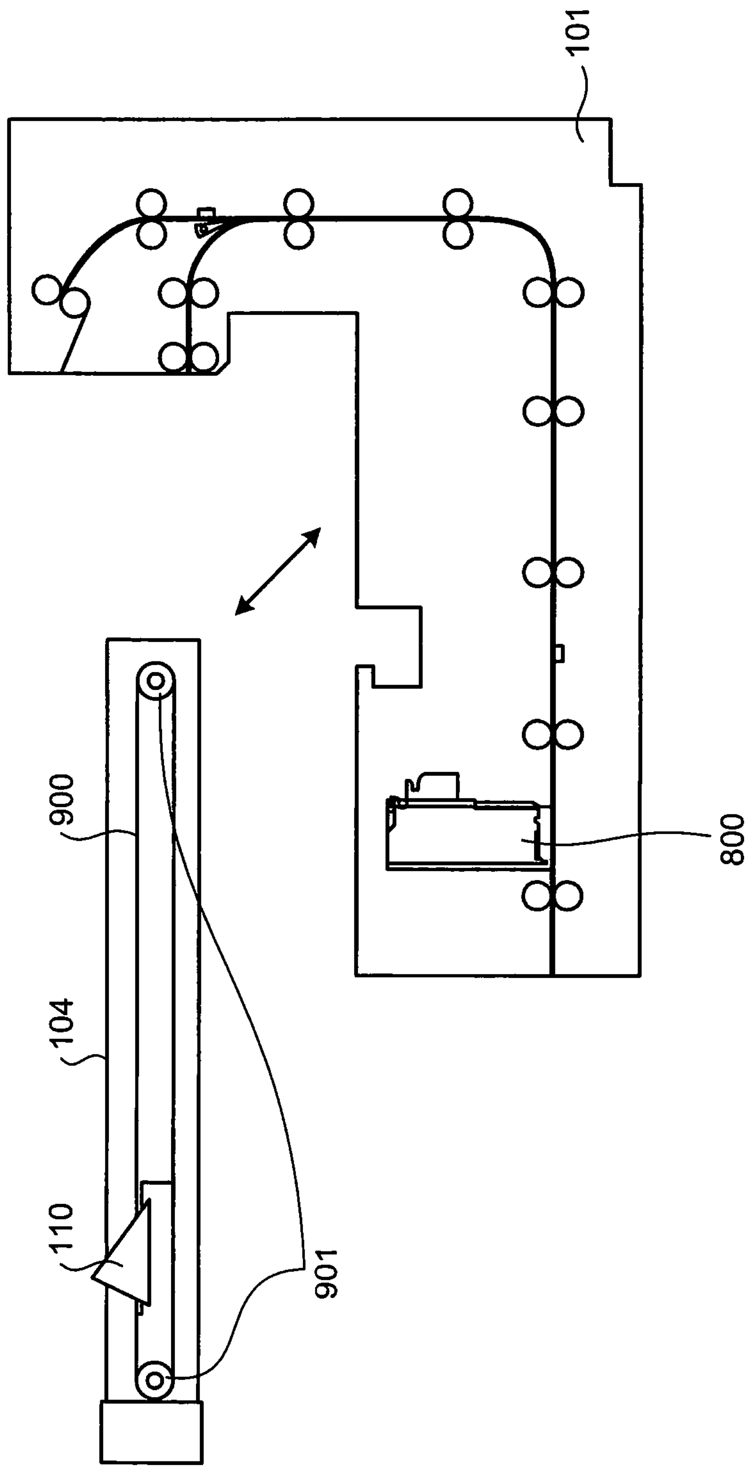
FIG. 9 is a sectional view of the internal configuration of the upper casing of the printing apparatus according to the embodiment of the present invention (part 2)

The structure of the upper casing 101 will be described. FIGS. 8 and 9 are sectional views of an internal configuration of the upper casing of the printing apparatus according to the embodiment of the present invention. In FIG. 8, 800 denotes the back surface printer, 801 denotes a second conveyance path extending from the back surface printer 800 to the sorter 104 (strictly speaking, a path from the upper casing inlet 706 to a printing position of the back surface printer 800 is equivalent to the first conveyance path, which is continuous with the second conveyance path); 802 denotes a conveyance roller.

The second conveyance path 801 continues to a second conveyance path exit 804, at which papers are discharged, falling onto the sorter 104 (onto a sorter conveyer belt 900) to be stacked on the sorter conveyer belt.

803 denotes a paper sensor that is disposed on the second conveyance path 801 and detects a paper discharged from the back surface printer 800. In addition to the paper sensor 803, paper sensors similar to the paper sensor 803, which are not depicted, are disposed at multiple locations along the first conveyance path and the second conveyance path 801. These paper sensors are used to detect the conveyance of a paper, paper-jamming, etc.

The second conveyance path 801 has another second conveyance path exit 805, in addition to the second conveyance path exit 804, and the discharge exit for a paper is determined by controlling the conveyance path switching unit 806. A paper discharged from the second conveyance path exit 805 is stored by being placed on the paper storage tray 106.

The back surface printer 800 prints given information on the back surface of a paper. The back surface printer 800, specifically, is provided as, for example, a wire-dot printer that causes ejectors of pins (e.g., 9 pins) of the head to strike an ink ribbon to print. The wire-dot printer is simple in configuration and small in size, thus optimal for printing given information as described below. The back surface printer 800, however, is not limited to a wire-dot printer, and may be any type of printer.

Given information printed by the back surface printer 800 is, for example, color compensation recording data generated upon printing a color image by the image printer 700. More specifically, given information is represented by alphanumeric symbols for each RGB tone. The date of printing, the date of photographing in a case of a photographic image, an ID number for an image, etc., may also be printed as given information. Besides alphanumeric symbols, hiragana, katakana, kanji, symbols, bar codes, etc., may also be printed.

The sorter 104 includes the sorter conveyer belt 900, sorter conveyance rollers 901, and a paper placement sensor 110. As depicted in FIGS. 1 and 7, the sorter conveyer belt 900 is composed of two belts that are put over the sorter conveyance rollers 901 across a given interval. The paper placement sensor 110 is disposed in the given interval. The sorter conveyance rollers 901 are rotated by the rotational drive of a non-depicted motor. The sorter conveyance rollers 901 rotate to cause the sorter conveyer belt 900 to move in the direction indicated by the arrow. The sorter 104 also has a sorter auxiliary tray 105.

A paper discharged from the second conveyance path exit 804 falls onto the sorter conveyer belt 900 at a location near the second conveyance path exit 804. In this state, the next paper discharged from the second conveyance path exit 804 falls on top of the paper having already fallen. By repeating this process, papers are stacked in the order of discharge.

After the last paper of the ordered count is discharged, the sorter conveyance rollers 901 are rotated counterclockwise with reference to FIG. 8 by a given number of rotations. As a result, the sorter conveyer belt 900 moves leftward with reference to FIG. 8 and then stops. A group ("stack") of papers placed on the sorter conveyer belt 900 also moves leftward in FIG. 8, as the sorter conveyer belt 900 does.

In this state, a new paper discharged from the second conveyance path exit 804 falls onto a location different from the location where the previous "stack" is formed on the sorter conveyer belt 900, and is placed on a new location. As papers continue to be discharged in the same manner, another "stack" different from the previous "stack" is formed. In this manner, each stack of papers is sorted.

Such "stacks" are formed respectively at paper sorting. When the first "stack" comes in contact with the paper placement sensor 110 in the course of repetition of this process, the paper placement sensor 110 is turned on. The paper placement sensor 110 prevents a sorted "stack" from falling from the sorter 104 onto the floor to scatter as a result of excessive movement of the sorter conveyer belt 900. A subsequent print order is not accepted when the paper placement sensor 110 is on. Therefore, paper transfer operation (printing operation) is suspended.

When an operator removes the "stack" that has turned on the paper placement sensor 110, a printing order can be accepted and paper printing/conveyance is resumed. The sorter 104 of FIG. 8 is capable of sorting papers into three "stacks", and the first "stack" turns on the paper placement sensor 110 at the point in time of formation of the third "stack". The sorter 104 is thus capable of sorting up to a third order but does not accept a fourth order. The number of orders can be accepted for sorting, however, depends on the size of the papers and the size of the sorter. In this manner, with the sorter 104, papers can be sorted according to order.

The scattering of papers falling onto the floor may be prevented by stopping the paper placement sensor 110 from functioning to let papers fall into the sorter auxiliary tray 105 for storage. This allows the printing process to be carried out continuously.

The sorter is disposed in a space under the position of the paper storage tray 106, which is a nonstandard storage tray. As depicted in FIG. 8, the sorter 104 is disposed above the back surface printer 800. In this manner, the back surface printer 800 and the sorter 104 are integrated into the casing to shorten the conveyance path from the back surface printer to the sorting unit as much as possible. The paper storage tray 106 is disposed above the sorter 104.

This configuration facilitates a process of sorting papers having undergone back printing and discharge of sorted papers, and also facilitates discharge of papers stored in the paper storage tray 106 and prevents the paper storage tray 106 from being obstructive to the sorting process by the sorter 104. The sorter 104 must be of a prescribed size or greater to secure the number of stacks to be sorted. Even in such a case, however, the limited space on the upper side of the printing apparatus 100 can be utilized effectively.

As depicted in FIG. 9, the sorter 104 is detachable from the upper casing. Because the sorter 104 can be attached and detached easily, maintenance of the back surface printer 800, such as ink replacement, and recovery from paper-jamming can be carried out more efficiently.

In this manner, the back surface printer 800 and the sorter 104 are connected through the upper casing 101 to the top of the lower casing. This enables effective use of the upper aspect of the lower casings 102 and 103 of the printing apparatus 100. The back surface printer 800 and the sorter 104 are formed integrally to facilitate attachment. The back surface printer 800 is disposed in the upper casing 101 to enable a single back printer to carry out printing on the back surfaces of papers bearing images printed by the image printers 700. This enables further space-saving.

(Configuration of Control Unit)

Figure 10:
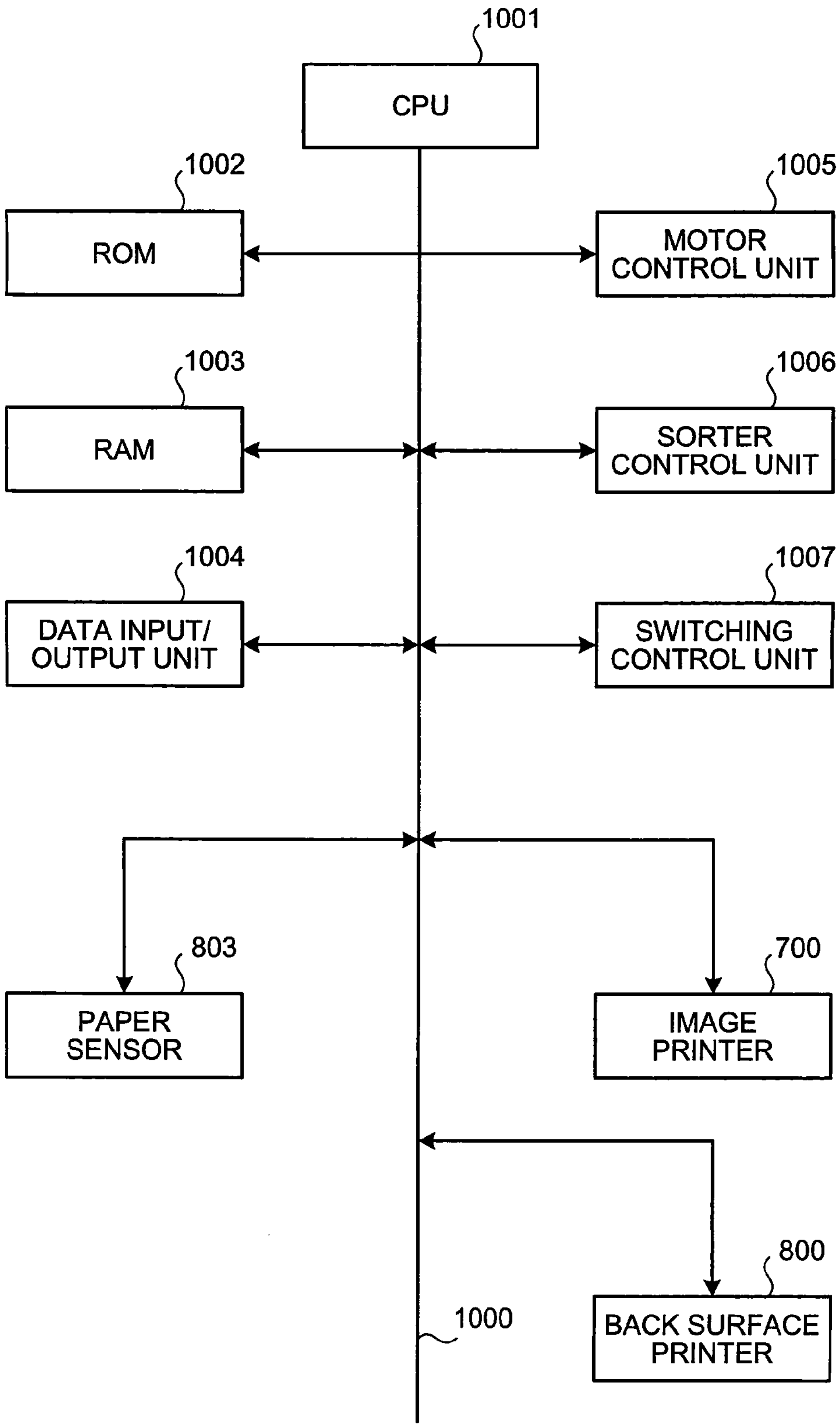
FIG. 10 is a block diagram of a hardware configuration of a control unit of the printing apparatus according to the embodiment of the present invention.

The control unit that controls operation of the printing apparatus will be described. FIG. 10 is a block diagram of a hardware configuration of the control unit of the printing apparatus according to the embodiment of the present invention. As depicted in FIG. 10, the control unit includes a CPU 1001, a ROM 1002, a RAM 1003, and a data output unit 1004. The CPU 1001 executes programs stored in the ROM 1002 and the RAM 1003 to realize functions of a motor control unit 1005, a sorter control unit 1006, and a switching control unit 1007, respectively connected via a bus 1000, and further connected to the image printer, the back surface printer, and the paper sensor.

The CPU 1001 executes programs stored in the ROM 1002 and the RAM 1003 to govern overall control of the printing apparatus including control of printing by the image printer 700 and the back surface printer 800. The ROM 1002 and the RAM 1003 store therein control programs, data, etc., for the CPU. Hence, programs stored for the CPU 1001 are executed realizing a series of processes of image printing, paper conveyance, back printing, and sorting.

The data input/output unit 1004 acquires the image printer 700 and the back surface printer 800 via the USB/LAN connection terminal 601, and also acquires information concerning various settings for the printing apparatus 100. The data input/output unit 1004 transmits malfunction information of the printing apparatus 100 (e.g., low on paper or ink, paper-jamming, etc.) to a main computer via the USB/LAN connection terminal. A function of the data input/output unit 1004, specifically, is realized through, for example, the USB/LAN connection terminal 601 and data input/output control circuit thereof.

The motor control unit 1005 independently controls the rotational drive of each of the non-depicted motors that rotate rollers disposed on the first conveyance path and the second conveyance path 801 and thus, realizes paper conveyance operation. An example of a procedure of conveyance control will be described hereinafter.

The sorter control unit 1006 controls the sorter to realize sorting according to order. Specifically, the sorter control unit 1006 controls the rotational drive of the motor that rotates the sorter conveyance rollers 901. The sorter control unit 1006 also carries out printing control for the image printer 700 and the back surface printer 800 and conveyance control through the motor control unit 1005, based on an incoming detection signal from the paper placement sensor 110.

The switching control unit 1007 causes the conveyance path switching unit 806 to switch automatically based on specifications for a paper printed and conveyed, or to switch based on instruction information input in advance by an operator and thus, determines whether a paper is to be discharged to the sorter 104 or to be discharged to the paper storage tray 106.

(Procedure of Processes for Conveyance Control)

Figure 11:
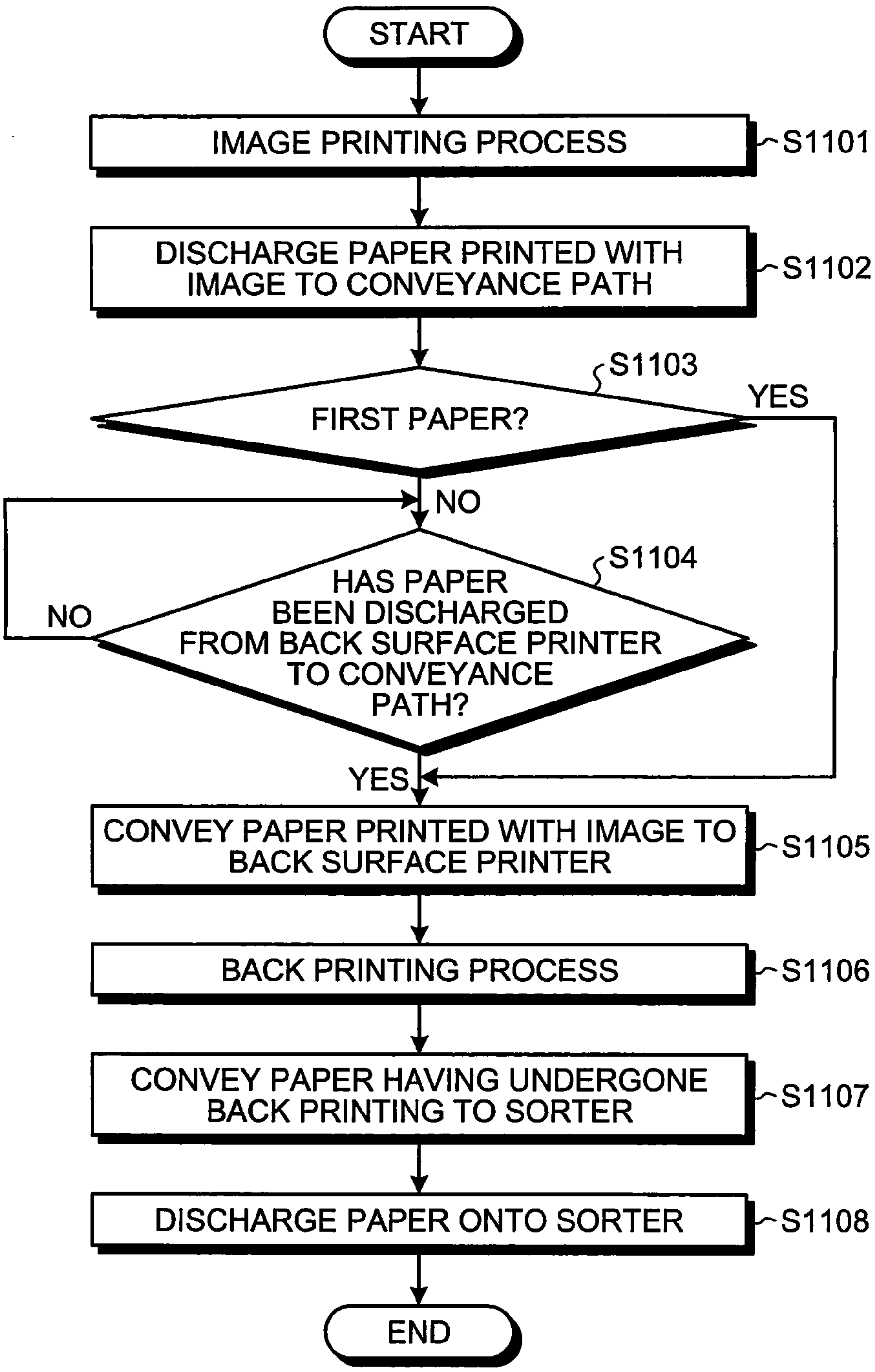
FIG. 11 is flowchart of an example of a procedure of paper conveyance control in the printing apparatus according to the embodiment of the present invention (part 1)
Figure 12:
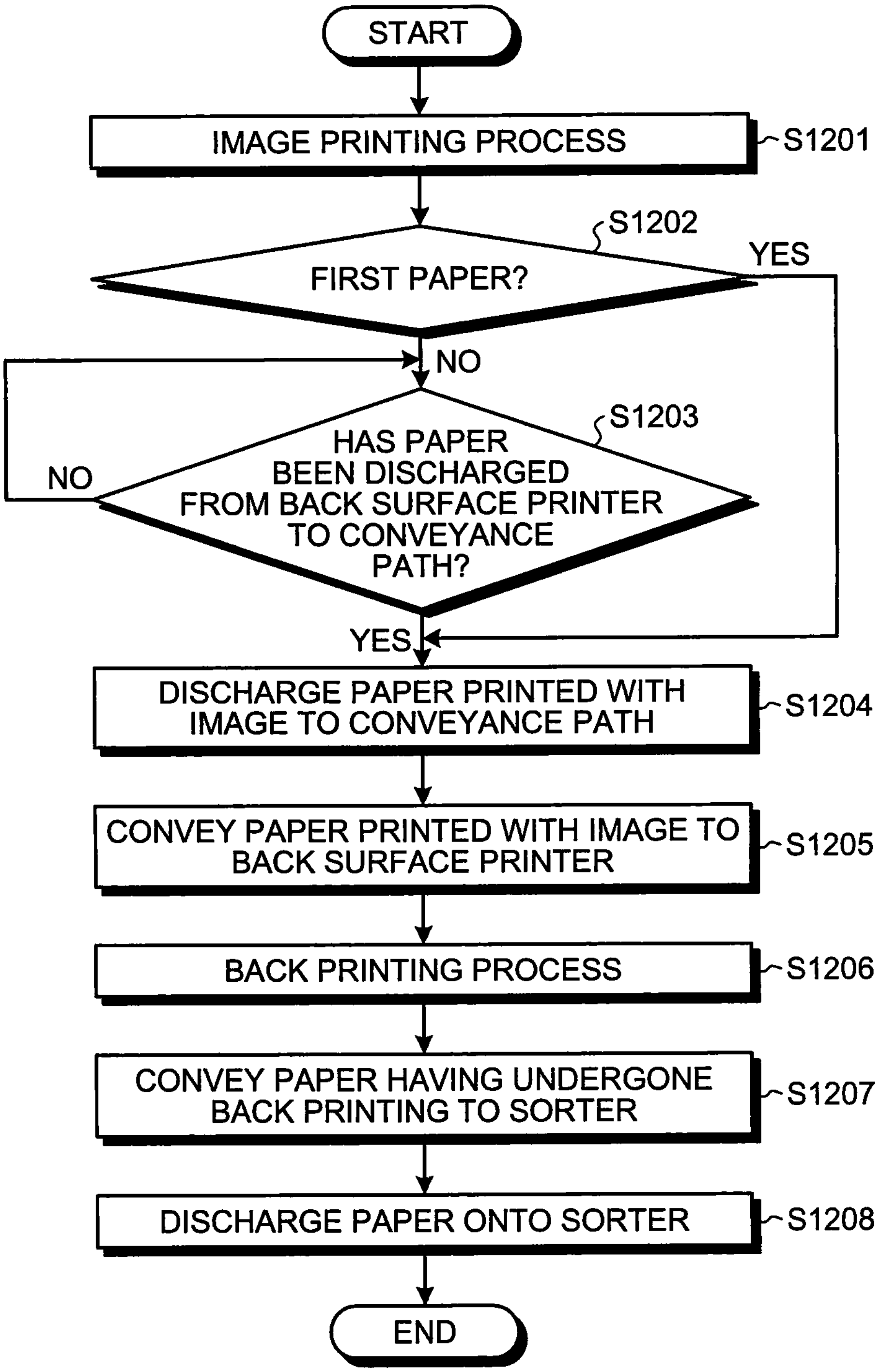
FIG. 12 is flowchart of an example of a procedure of paper conveyance control in the printing apparatus according to the embodiment of the present invention (part 2).

FIGS. 11 and 12 are flowcharts of an example of a procedure of paper conveyance control in the printing apparatus according to the embodiment of the present invention. In the flowchart of FIG. 11, any one of the image printers 700 is caused to carry out the image printing process (step S1101). A printed paper having undergone the image printing process is discharged from the discharge outlet 701 of the image printer 700 to the lower casing inlet 702 (step S1102).

Next, whether a paper is present in the first conveyance path is determined (step S1103). If a paper is not present in the first conveyance path (step S1103: YES), flow proceeds to step S1105. On the other hand, if a paper is present in the first conveyance path (step S1103: NO), whether a paper that was in the first conveyance path has been discharged from the back surface printer 800 to the second conveyance path is determined (step S1104).

At step S1104, if the paper has not yet been discharged to the second conveyance path (step S1104: NO), discharge is waited for. During the waiting, the paper conveyance rollers for the first conveyance path are suspended. When discharge, from the back surface printer 800 to the second conveyance path, of the paper that was in the first conveyance path is detected (step S1104: YES), the suspended paper conveyance rollers are driven to rotate and convey the printed paper having undergone the image printing process to the back surface printer 800 (step S1105).

Subsequently, the back surface printer 800 carries out the printing process on the back surface of the paper (step S1106), and the paper having undergone back printing and discharged from the back surface printer 800 to the second conveyance path is conveyed to the second conveyance path discharge outlet 804 near the sorter 104 (step S1107), and then the paper is discharged to the sorter 104 (step S1108), ending a series of processes.

In the flowchart of FIG. 12, any one of the image printers 700 is caused to carry out only the image printing process (step S1201), and discharge, from the discharge outlet 701 of the image printer 700 to the lower casing inlet 702, of a printed paper having undergone the image printing process is temporarily suspended. In this state, whether a paper is in the first conveyance path is determined (step S1202). If a paper is not in the first conveyance path (step S1202: YES), the procedure proceeds to step S1204.

If a paper is in the first conveyance path (step S1202: NO), whether a paper that was in the first conveyance path has been discharged from the back surface printer 800 to the second conveyance path is determined (step S1203). If the paper has not been discharged to the second conveyance path (step S1203: NO), discharge of the paper is waited for. During the period of waiting for paper discharge, a non-depicted paper discharging mechanism of the image printer 700 and the paper conveyance rollers on the first conveyance path are suspended.

When discharge, from the back surface printer 800 to the second conveyance path, of the paper that was in the first conveyance path is detected (step S1203: YES), operation of the suspended discharging mechanism of the image printer 700 is resumed to discharge, from the discharge outlet 701 to the lower casing inlet 702, the printed paper having undergone the image printing process (step S1204), and the paper conveyance rollers are driven to rotate and convey the paper having undergone the image printing process to the back surface printer 800 (step S1205).

Subsequently, in the same manner as in the procedure of FIG. 11, the back surface printer 800 carries out the printing process on the back surface of the paper (step S1206), and the paper having undergone back printing and discharged from the back surface printer 800 to the second conveyance path is conveyed to the conveyance path discharge outlet 804 near the sorter 104 (step S1207), and then the paper is discharged onto the sorter 104 (step S1208), ending a series of processes.

Under paper conveyance control in this manner, for example, even if a malfunction, such as paper-jamming, occurs along the second conveyance path, remedying the malfunction to restore the printing apparatus allows a paper already printed with an image to be continuously conveyed to the back surface printer 800. This eliminates a need of reprinting an image and thus, prevents the wasting of a paper already printed with an image and reduces image printing time. Paper conveyance control may be carried out according to either of the procedures depicted in FIGS. 11 and 12, and is selected appropriately according the configurations of the discharging mechanism of the image printer 700 and the first conveyance path.

As described above, according to the embodiment of the present invention, the printing apparatus includes the image printers 700 each of which prints an image on the front surface of a paper, the back surface printer 800 that prints given information on the back surface of a paper printed with an image by the image printers 700, the sorter 104 that sorts papers printed with given information on the back surfaces by the back surface printer 800, the first conveyance path that conveys to the back surface printer 800, a paper printed with an image on the front surface by the image printer 700, and the second conveyance path that conveys to the sorter 104 for discharge onto the sorter 104, a paper printed with given information on the back surface by the back surface printer 800. Hence, a paper is printed with an image by the image printers 700, and then is printed with given information on the back surface thereof by the single back surface printer 800, and is conveyed to the sorter 104.

In this manner, the image printers 700 are operated simultaneously to increase image printing speed. Papers printed with images by the image printers 700 are collectively printed with given information on the back surfaces by the single back surface printer 800, and are discharged.

According to the embodiment of the present invention, the sorter 104 is disposed above the back surface printer 800. This allows a space above the back surface printer 800 to be used efficiently to realize the sorting process and enables saving space for the printing apparatus 100 and facilitating discharge of papers to improve operability.

According to the embodiment of the present invention, the back surface printer 800, the sorter 104, the paper storage tray 106, and the second conveyance path are integrated into the upper casing 101. This facilitates attachment of these component units to the lower casings 102 and 103 and enables effective use of a space on top of the lower casing 102 and thus, contributes to space-saving. The upper casing 101 is disposed on top of the vertically aligned lower casings 102 and 103 housing the image printers 700 therein. In this configuration, the sorter is set at an upper aspect with consideration of facilitating paper discharge. Since the image printers 700 are housed in a vertical arrangement, further space-saving is achieved.

According to the embodiment of the present invention, the printing apparatus includes the paper storage tray 106 above the sorter 104, the second conveyance path that conveys to the sorter 104 and to the paper storage tray 106, a paper printed with given information on the back surface by the back surface printer 800, and the conveyance path switching unit 806 that carries out switchover between discharge of a paper onto the sorter 104 and discharge of a paper onto the paper storage tray 106. This enables automatic separation of papers into papers to be discharged onto the sorter and other papers. Because the sorter and the paper storage tray are arranged at a lower position and an upper position, respectively, the sorter and the paper storage tray do not obstruct each other, so that papers discharged onto the sorter and onto the paper storage tray can be discharged easily. This enables saving space for the printing apparatus 100, and facilitates paper discharge to improve operability.

According to the embodiment of the present invention, the back surface printer 800, the sorter 104, the paper storage tray 106, and the second conveyance path 801 are integrated into the casing. This facilitates attachment of these component units to the lower casings 102 and 103 and enables effective use of a space on top of the lower casing 102. A matching of the size of the casing and the size of the lower casing 102 enables further space-saving.

According to the embodiment of the present invention, the sorter 104 is detachable from the upper casing 101. This enables more efficient maintenance of the back surface printer 800, such as ink replacement and recovery from paper-jamming.

According to the embodiment of the present invention, the paper sensor 803 is disposed along the second conveyance path 801, and when the paper sensor 803 detects discharge of a paper printed with given information on the back surface from the back surface printer 800 to the second conveyance path, the motor control unit 1005 causes the first conveyance path to convey a paper printed with an image on the front surface by the image printer 700 to the back surface printer 800. When a printer does not operate properly, such as the back surface printer 800 running out of ink, etc., a paper already printed with an image is caused to stand by to prevent a malfunction, such as paper-jamming, near the back surface printer 800. This prevents the wasting of a paper already printed with an image.

When a malfunction occurs only at the back surface printer 800, image printing is carried out during recovery of the back surface printer 800, which is kept suspended during recovery. As a result, printing time can be reduced when operation of the back surface printer has recovered.

According to the embodiment of the present invention, the paper sensor 803 is disposed along the second conveyance path 801, and when the paper sensor 803 detects discharge of a paper printed with given information on the back surface from the back surface printer 800 to the second conveyance path, the control unit causes the image printer 700 to discharge a paper printed with an image on the front surface to the first conveyance path. When a printer does not operate properly, such as the back surface printer 800 running out of ink, etc., the production of a paper printed with an image only on the front surface and with nothing on the back surface is prevented, so that paper is not wasted.

The printing apparatus is configured to first complete printing of an image on a paper and then print given information of the image on the back surface of the paper. When papers bearing recorded images are to be discharged in a given order, even if malfunction occurs at an image printer that is to discharge a paper first, after another image printer that has not yet printed an image prints the image to be discharged first, the back surface printer carries out back printing. In this manner, even if the malfunction occurring at the image printer to discharge a paper first has not been remedied yet, image printing and back printing can be completed in the given order without discarding the paper. This enables an efficient recording process.

INDUSTRIAL APPLICABILITY

As described above, the printing apparatus of the present invention is applicable to be used as a printing apparatus that carries out photographic printing, such as so-called mini-lab.

The invention claimed is:

1. A printing apparatus comprising:
- a plurality of image printers that print an image on a front surface of a paper, respectively;
- a casing that houses the image printers and includes a door member;
- a back surface printer that prints given information on a back surface of the paper printed with the image by one of the image printers, the given information being related to the printing of the image on the front surface of the paper by the one of the image printers;
- a sorting unit that sorts papers printed with the given information on back surfaces by the back surface printer;
- a first conveying unit that conveys the paper printed with the image on the front surface by the one of the image printers to the back surface printer; and
- a second conveying unit that conveys the paper printed with the given information on the back surface by the back surface printer to the sorting unit to discharge the paper onto the sorting unit;

wherein
- the first conveying unit and the second conveying unit form a continuous conveyance path, and
- the first conveying unit is disposed inside the door member.

2. The printing apparatus according to claim 1, wherein the sorting unit is disposed above the back surface printer.

3. The printing apparatus according to claim 2, wherein the back surface printer, the sorting unit, and the second conveying unit are integrated into the casing.

4. The printing apparatus according to claim 2, comprising a paper storage tray above the sorting unit, wherein the second conveying unit includes:
- a conveyance path that conveys the paper printed with the given information on the back surface by the back surface printer to the sorting unit and to the paper storage tray; and
- a switching unit that carries out switchover between discharge of the paper to the sorting unit and discharge of the paper to the paper storage tray.

5. The printing apparatus according to claim 4, wherein the back surface printer, the sorting unit, the paper storage tray, and the second conveying unit are integrated into the casing.

6. The printing apparatus according to claim 3, wherein the casing is disposed on top of the image printers vertically aligned.

7. The printing apparatus according to claim 3, wherein the sorting unit is detachable from the casing.

8. The printing apparatus according to claim 1, wherein the second conveying unit includes a paper sensor, and the first conveying unit conveys to the back surface printer, the paper printed with the image on the front surface by the one of the image printers, when the paper sensor detects discharge, from the back surface printer to the second conveying unit, of the paper printed with the given information on the back surface.

9. The printing apparatus according to claim 1, wherein the second conveying unit includes a paper sensor, and the one of the image printers discharges the paper printed with the image on the front surface to the first conveying unit, when the paper sensor detects discharge, from the back surface printer to the second conveying unit, of the paper printed with the given information on the back surface.

* * * * *